United States Patent [19]
Lee

[11] Patent Number: 5,314,924
[45] Date of Patent: May 24, 1994

[54] ANTISTATIC POLYOLEFIN COMPOSITION

[75] Inventor: Shau-Tarng Lee, Oakland, N.J.

[73] Assignee: Sealed Air Corporation, Saddle Brook, N.J.

[21] Appl. No.: 133,891

[22] Filed: Oct. 12, 1993

[51] Int. Cl.$^5$ .............................................. C08J 9/14
[52] U.S. Cl. .................................. 521/79; 264/53; 521/57; 521/81; 521/89; 521/93; 521/97; 521/143
[58] Field of Search ................... 521/79, 89, 97, 93, 521/57, 143, 81; 264/53

[56] References Cited

U.S. PATENT DOCUMENTS

| | | | |
|---|---|---|---|
| 3,867,319 | 2/1975 | Lundberg | 521/88 |
| 3,947,387 | 3/1976 | Lundberg | 521/144 |
| 4,294,882 | 10/1981 | Andrews et al. | 428/349 |
| 4,343,911 | 8/1982 | Hoki et al. | 521/88 |
| 4,602,047 | 7/1986 | Endo et al. | 521/58 |
| 4,726,968 | 2/1988 | Hayashi et al. | 427/342 |
| 4,837,045 | 6/1989 | Nakajima | 427/458 |
| 4,842,903 | 6/1989 | Hayner | 427/428 |

FOREIGN PATENT DOCUMENTS 72026171 7/1972 Japan .
74020067 5/1974 Japan .

OTHER PUBLICATIONS

Victor Wigotsky; "Additives"; *Plastics Engineering*; vol. v46; Issue No. n11; pp. 21(7); Nov. 1990.
"Additives 1991"; *Plastics Engineering*; vol. v 47; Issue No. n9; pp. 12(18); Sep. 1991.
"New antistatic chemicals could prevent static electricity-based damage to electronic assemblies, which cost over $500 mil in damage in 1980." *Modern Plastics*; Sep. 1981; p. 84,851—Dialog Report.

*Primary Examiner*—Morton Foelak
*Attorney, Agent, or Firm*—Bell, Seltzer, Park & Gibson

[57] ABSTRACT

An expandable polyolefin composition is disclosed for forming antistatic foam products. The composition includes a polyolefin resin; a hydrocarbyl sulphonate; and an ester of a long-chain fatty acid and polyhydric alcohol. Each of the sulphonate and the ester are present in the composition in an amount sufficient to form a polyolefin product having desirable antistatic properties. A process for extrusion foaming of the composition, and thus formed foam products, are also disclosed.

19 Claims, No Drawings

ANTISTATIC POLYOLEFIN COMPOSITION

FIELD OF THE INVENTION

This invention relates to a polyolefin composition, and more particularly to a polyolefin composition useful in forming antistatic foam products.

BACKGROUND OF THE INVENTION

Thermoplastic foams are finding increasing use in the manufacture of a wide range of articles. Typically, foam products are formed by adding a "blowing agent" to a thermoplastic resin and subjecting the resultant mixture to conditions under which the resin is expanded. For example, in an extrusion foaming process, a blowing agent is mixed with a molten thermoplastic resin under pressure and the mixture is then cooled and extruded through a forming die into a zone of reduced pressure. The blowing agent expands in the zone of reduced pressure, thereby expanding the thermoplastic resin to produce a cellular thermoplastic structure having far less density than the resin from which the foam is made. The foam structure is maintained by replacing with air the blowing agent in the cells of the foam.

Thermoplastic foam products can be used in a variety of applications, such as insulating materials, packaging and cushioning materials, and the like. For example, polyolefin foam products provide good insulating and cushioning properties desirable for these applications. In many packaging applications, such as packaging of electronic devices, it can be advantageous to use foam packaging that exhibits antistatic characteristics. However, polyolefin foam products readily acquire static charges, for example during processing of the foam product. This can result in a variety of problems, including poor handling properties, adherence of particles of dust and other foreign matter to the polymer, interference with electronic devices packaged therein, and the like.

Various techniques have been developed to address the tendency of thermoplastic polymers to accumulate static charges. One technique is the development of more electrically conductive polymers. Another technique is copolymerization of an antistatic resin with the base polymer. These techniques, however, can be limited by multiple, complex and expensive reagents and processing conditions.

Other techniques have addressed this problem by incorporating a small quantity of an antistatic agent into the thermoplastic resin. The antistatic agent migrates to the surface of the plastic product to modify its electrical properties. Conventional antistatic agents used in processing polyolefin resins include fatty ammonium compounds, fatty amide or amines, and phosphate esters. However, while antistatic properties can be provided using these antistatic compounds, the resultant polyolefin foam products do not exhibit good stress-cracking performance properties. For example, many electrical devices include a polycarbonate substrate. Amine and amide-type antistatic agents are not compatible with polycarbonate, and when contacted to the surface of a polycarbonate device, the polycarbonate product swells, thereby causing cracking in the packaging.

In addition, amine and amide-type antistatic agents can have a corrosive impact on metal substrates. Thus in many packaging applications, the item being packaged may not be able to tolerate direct contact with the foam itself.

Accordingly, despite these and other techniques for forming antistatic polyolefin foam products, it would be desirable to provide an antistatic polyolefin foam product which not only exhibits good antistatic properties but also good stress crack resistance. Further, it would be desirable to provide an antistatic polyolefin foam product which does not have a corrosive effect upon metal substrates. In addition, it would be advantageous to provide foam products exhibiting these and other desired characteristics which could be readily prepared using existing processes and equipment.

SUMMARY OF THE INVENTION

The present invention is directed to thermoplastic compositions useful in forming thermoplastic foam products which exhibit good antistatic properties. The composition of the invention includes a polyolefin resin. The polyolefin resin may be selected from any of the polyolefin resins known in the art for foam processing, and preferably is a polyethylene.

To provide the good antistatic properties to the polyolefin resin, without the attendant problems associated with known techniques and agents, an antistatic agent is selected from each of two categories of antistatic agents, and each antistatic agent selected is mixed with the polyolefin resin. It has been found that the combination of antistatic agents selected from these two different categories can provide a polyolefin composition which, when subjected to foaming processes known in the art, results in a polyolefin foam product having desirable characteristics. Specifically, the resultant polyolefin foam products exhibit improved antistatic properties as compared to polyolefin foam products produced using either of the types of antistatic agents individually.

The first category of antistatic agents mixed with the polyolefin resin includes esters of long-chain fatty acids and polyhydric alcohols. A particularly preferred ester is glycerol monostearate. The compositions of the present invention also include a second antistatic agent, an anionic hydrocarbyl sulphonate, and preferably a sodium C10 to C18 alkyl sulphonate.

Each of the antistatic agents of the present invention are mixed with the polyolefin resin in an amount sufficient to form a polyolefin foam product having desirable antistatic properties. Preferably, the hydrocarbyl sulphonate is mixed with the polyolefin resin in an amount from about 0.05 to about 1.5, and more preferably about 0.2 to about 0.7, percent by weight of the polyolefin, and the fatty acid ester is added in an amount from about 0.3 to about 3.0, and more preferably about 0.7 to about 2.0 percent by weight of the polyolefin.

The invention also relates to a process for producing an expanded polyolefin foam wherein a plasticized polyolefin composition described above is mixed with a blowing agent and then extruded through an extruder to produce the foamed polyolefin product.

In yet another embodiment, a foam polyolefin product formed of the polyolefin composition of the invention is provided. The polyolefin foam products exhibit good antistatic properties, thus eliminating the concerns of static electricity buildup on a foam product during processing. Specifically, the foam products of the invention exhibit a decay rate after one day of less than about two seconds, and after four days of less than about two seconds. Further, the polyolefin foam products exhibit good stress-cracking resistance and have a substantially non-corrosive impact on metal devices. The polyolefin foam products are particularly useful as packaging materials for components which require static dissipation, such as electronic devices.

DETAILED DESCRIPTION OF THE INVENTION

Thermoplastic resins contemplated for use in the practice of the invention claimed herein include polyolefin resins. Polyolefin resins are defined as polymers derived from unsaturated hydrocarbons containing the ethylene or diene functional groups. Polyolefin resins may include virtually all of the addition polymers; however, the term polyolefin typically is used for polymers of ethylene, the alkyl derivatives of ethylene (the alpha-olefins), and the dienes. Olefin resins suitable for use in the practice of the present invention include ethylene homopolymers, such as low, medium, or high density polyethylene; polypropylene; polybutene; and copolymers and blends thereof, including ethylene copolymers such as ethylene-propylene copolymers, ethylene-1-butene copolymers, and the like. Polyethylene resins are particularly useful in the practice of the invention claimed herein.

To form the polyolefin composition of the invention, an antistatic agent is selected from each of two categories of antistatic agents described in more detail below, and each antistatic agent thus selected is mixed with the polyolefin resin. It has been found that the combination of antistatic agents selected from these two different categories of such agents can provide a polyolefin composition which, when subjected to foaming processes known in the art, results in a polyolefin foam product having desirable characteristics. Specifically, the polyolefin foam products of the invention exhibit improved antistatic properties as compared to polyolefin foam products produced using only one antistatic agent selected from either of the two categories described below in combination with the polyolefin resin.

The first category of antistatic agents mixed with the polyolefin resin includes esters of long-chain fatty acids and polyhydric alcohols. As used herein, the term "long-chain fatty acid" refers to compounds of the formula R—COOH, wherein R is an alkyl having 4 to 23 carbon atoms. Preferred long chain fatty acids are those having the formula $CH_3(CH_2)_{16}$—COOH, known as stearic acid. The term "polyhydric alcohol" refers to an alcohol containing three or more hydroxyl groups. Preferred polyhydric alcohols are those having three hydroxyl groups, i.e., glycerols. Thus as used herein, the term "ester of long-chain fatty acids and polyhydric alcohols" refers to esters formed of the compounds defined above to provide a compound having the general formula R—$COOCH_2CHOHCH_2OH$, wherein R is an alkyl having 4 to 23 carbon atoms.

Glycerol monostearate has been determined to be particularly useful as one of the antistatic agents in the practice of the invention claimed herein. Glycerol monostearate compounds are known in the art and are available commercially. Exemplary glycerol monostearate products include compounds sold commercially as ATMER® 129 by the Imperial Chemical Corporation, Wilmington, Del. (ICI), and ATMOS 150 by the Humko Chemical Division of the Witco Chemical Corporation, Oakland, N.J.

In addition to the esters described above, the compositions of the present invention also include a second antistatic agent, an anionic hydrocarbyl sulphonate. As will be appreciated by the skilled artisan, sulphonate compounds are defined as the salts of an hydrocarbyl sulfonic acid having the general formula R—$SO_3$—X, wherein R is alkyl, aryl, or alkyl aryl, and X is a metal or its equivalent, e.g., an $NH_4$ radical. In a preferred embodiment of the invention, X is an alkali or alkaline earth metal, and R is a C10 to C18 alkyl. In a particularly preferred embodiment of the invention, the anionic hydrocarbyl sulphonate is a sodium C10 to C18 alkyl sulphonate. Such sulphonates are known in the art and exemplary sulphonates are commercially available from Imperial Chemical Corporation, Wilmington, Del. (ICI) under the trade designation ATMER® 190.

Each of the antistatic agents of the present invention, i.e., the hydrocarbyl sulphonate and the fatty acid ester, are mixed with the polyolefin resin in an amount sufficient to form a polyolefin foam product having desirable antistatic properties, as defined below. As will be appreciated by the skilled artisan, the amount of each of the antistatic agents mixed with the polyolefin is dependent on the type of resin, the blowing agent used, and the shape and physical and mechanical properties desired for the resultant foam product. More specifically, the hydrocarbyl sulphonate is mixed with the polyolefin resin in an amount from about 0.05 to about 1.5 percent by weight of the polyolefin, and the fatty acid ester is added in an amount from about 0.3 to about 3.0 percent by weight of the polyolefin. More preferably, the sulphonate is present in the polyolefin resin in an amount from about 0.2 to about 0.7 percent by weight of the polyolefin, and the fatty acid ester is present in the composition in an amount from about 0.7 to about 2.0 percent by weight of the polyolefin.

Preferably, each of the antistatic agents is mixed with the polyolefin resin prior to processing thereof. The blends of this invention are typically prepared by dry blending solid state forms, i.e., powder or pellet, of the polyolefin and the antistatic agents. For example, the blends can be prepared by mixing the various components in a conventional blender, e.g., a tumble blender, a ribbon blender, a Henschel-type mixer, and the like. Other techniques known in the art for preparing a simple blend, such as preparing a blend from the components in liquid form, by preparing coated pellets, and the like, can also be used. For example, the antistatic agents may be mixed with the polyolefin resin in molten or heat plasticized form just before expansion of the composition. In addition, the antistatic agents can be provided in a concentrate form as a masterbatch.

After the blend is formed, the blend is processed using any of the various processes and equipment for foaming of thermoplastic resins known in the art. The selection of the appropriate operating conditions may be readily determined by those skilled in the art.

Preferably, the composition is processed using extrusion foaming techniques. Typically in extrusion foaming processes, the blend of resin and antistatic agents is fed through a hopper to a melting zone in which the resin is melted, or plasticized, to form a flowable thermoplastic mass.

The plasticized thermoplastic mass generally is then metered to a mixing zone where the thermoplastic mass is thoroughly mixed with a blowing agent under pressure for subsequent cooling and expansion of the resin to form a foam. Blowing agent typically is injected between the metering and the mixing zones. The mixture of thermoplastic resin and blowing agent is then forced through a die, which imparts a shape to the thermoplastic mass, into a zone of lower pressure, such as atmospheric pressure. The blowing agent expands to form the cells of the foam and the thermoplastic foam is cooled.

Typical of much of the equipment used for extrusion of thermoplastic foams, the polyolefin composition is conveyed from a hopper through the melt zone, the mixing and cooling zones, and extruded through the die by a screw type apparatus. Single screw extruders are common, although double screw extruders can be used for greater mixing.

When a blowing agent is injected into the mixing zone of the screw extruder, the blowing agent initially forms a dispersion of insoluble bubbles within the plasticized thermoplastic mass. These bubbles eventually dissolve in the thermoplastic mass as the mixing continues and the pressure increases down the length of the extruder. The extruder should have a length to diameter ratio of at least 30:1 and a sufficient length of mixing zone to ensure that proper mixing occurs.

The polyolefin resin should be maintained at a temperature within a range above the melting point of the polymer that is sufficiently high so that the polymer has sufficient fluidity for mixing with blowing agent. This range normally will be from about 20° C. to 100° C. above the melting point of the resin. The melting zone can be maintained at a somewhat lower temperature due to the heat that is generated by friction as the plasticized resin flows through the extruder.

After mixing, the temperature of the mixture of resin and blowing agent should be lowered closer to the melting point of the mixture so that the polymer maintains its structure upon foaming, but not so much that complete expansion is hindered. The blowing agent has a plasticizing effect on the resin reducing its viscosity, or resistance to flow, and so the melting point of the mixture of resin and blowing agent normally is below that of the resin alone. The expansion temperature is empirically determined and depends upon the composition of the resin, the length of the screw, whether single or double screws are used, on the specific resin, upon the amount of blowing agent, and the specific blowing agent blend. For a high density polyethylene, the expansion temperature will generally be in the range of from about 110° C. to 150° C. For a low density polyethylene, the expansion temperature will generally be in the range of from about 85° C. to 120° C.

Any of the blowing agents known in the art for expanding a thermoplastic composition can be used in accordance with the present invention. Exemplary blowing agents include volatile blowing agents, such as organic compounds having a boiling point lower than that of the polyolefin resin, for example, of not more than about 80° C. Examples thereof include hydrocarbons, such as n-butane, isobutane, propane, pentane, hexane, heptane, and mixtures thereof, and halogenated hydrocarbons, such as trichlorofluoromethane, dichlorofluoromethane, dichlorodifluoromethane, dichlorotetrafluoroethane, chlorodifluoromethane, chlorotrifluoromethane, 1,1-dichloroethane, 1-chloro-1,1-difluoroethane, monochlorotetrafluoroethane, chloropentafluoroethane, monofluoroethane, difluoroethane, tetrafluoroethane, methyl chloride, ethyl chloride, methylene chloride, and the like. The blowing agent may be used alone or in combination. Preferred blowing agents are the hydrocarbon blowing agents, and more preferably butane. Although the sulphonate antistatic agent can have a softening point greater than the melting point of the other components of the blend, the hydrocarbon chain component thereof promotes the solubility of the sulphonate in the blowing agent, particularly hydrocarbon and halogenated hydrocarbon blowing agents.

The amount of blowing agent added differs according to the type of blowing agent used and the desired degree of expansion of the polyolefin particles. The blowing agent is mixed into the polyolefin composition in proportions to achieve the desired degree of expansion in the resulting foamed cellular product. The blowing agent generally is mixed with the resin in a ratio of about 10 to 50 parts by weight per 100 parts by weight of the polyolefin resin particles. The maximum useful proportion of blowing agent in the plasticized resin is affected by the pressure that is maintained on the resin in the extrusion die passage, as is well known to the skilled artisan.

The polyolefin composition of this invention may also have added thereto other types of additives, such as ultraviolet absorbers, nucleating agents, stabilizers, lubricants, additional antistatic agents, coloring agents, antifungal agents, flame retardants and the like, depending on the ultimate use and desired properties of the extruded product.

The resultant foam polyolefin product exhibits a variety of desirable characteristics. The product has good antistatic properties as determined using techniques known in the art. For example, polyolefin foam products of the present invention which are preconditioned for 24 hours at 15% relative humidity and 21.1° C. exhibit a decay rate of less than about 2 seconds after 1 day, and less than about 2 seconds after 4 days. The polyolefin foam products of the present invention can exhibit improved antistatic properties as compared to polyolefin foam products produced using either of the types of antistatic agents individually.

The polyolefin foam products of the invention also exhibit several other desirable properties which may not be provided by the use of other antistatic agents, such as good stress-cracking resistance and noncorrosive impact on metal devices. Accordingly, the foam products of the invention are particularly desirable for use as packaging materials for components which require static dissipation, such as electronic devices.

The following example provides specific illustrations of the practice of the invention claimed herein, but is not intended in any way to limit the scope of the invention.

EXAMPLE

Five polyolefin foam samples were produced using a butane blowing agent. Samples 1 and 2 were prepared using a low density polyethylene ("LDPE"). To each of samples 1 and 2, glycerol monostearate ("GMS") available from ICI under the trade designation ATMER ® 129 was added in an amount of about 0.44 parts per hundred ("pph") of the LDPE. The samples were extruded on a 68 mm twin screw extruder at a LDPE flow rate of about 40 kg/hour. The thickness of sample 1 was about 3.3 mm and the thickness of sample 2 was about 3.2. No sulphonate was added to the LDPE composition.

Sample 3 was prepared using the same type and amount LDPE and glycerol monostearate as used in samples 1 and 2. In addition, a sodium alkyl sulphonate, available from ICI under the trade designation AT- MER ® 190, was mixed with the composition in an amount of about 1.0 pph of LDPE. As with samples 1 and 2, sample 3 was extruded on a 68 mm twin screw extruder at a LDPE flow rate of about 40 kg/hour. The thickness of sample 3 was about 2.8 mm.

Sample 4 was prepared using the same type and amount LDPE and glycerol monostearate of samples 1, 2, and 3. A sodium alkyl sulphonate, available from ICI under the trade designation ATMER ® 190, was mixed with the composition in an amount of about 1.3 pph of LDPE. As with samples 1, 2, and 3, sample 4 was extruded on a 68 mm twin screw extruder at a LDPE flow rate of about 40 kg/hour. The thickness of sample 4 was about 1.0 mm.

Lastly, sample 5 was prepared using the same LDPE of samples 1, 2, 3, and 4. Glycerol monostearate available from Witco Humko under the trade designation ATMOS ® 150 was added to the LDPE in an amount of about 1.8 pph. A sodium alkyl sulphonate, available from ICI under the trade designation ATMER ® 190, was mixed with the composition in an amount of about 0.2 pph of LDPE. Sample 5 was then extruded on a 90 mm twin screw extruder at a LDPE flow rate of about 100 kg/hour. The thickness of sample 5 was about 3.6 mm.

Each of samples 1-5 were evaluated for antistatic properties by analyzing the decay rate in seconds of each sample. Each sample was preconditioned for 24 hours under 15% relative humidity and at 21.1° C. Decay rate was tested after 1 day and 4 days. The antistatic activity of each sample was assessed using an instrument for measuring potential differences and electric charge, which included an electrode having a charge of +5 KV/−5 KV applied thereto. A decay rate period of less than about 2 seconds was taken to indicate fair to good antistatic activity.

The results obtained are set forth in Table 1 below. As set forth in the table, samples 1 and 2, which did not include both glycerol monostearate and the sulphonate, exhibited a decay rate greater than 2 seconds at day 1. By day 4, the decay rate was well over 60 seconds, indicating that the samples had essentially no antistatic properties. In contrast, in each of the samples which included both glycerol monostearate and the sulphonate exhibited good decay rates at both day 1 and day 4, indicating good antistatic properties.

TABLE 1

| Sample Run | Foam Thickness mm | GMS[2] PPH OF LDPE | SAS[3] PPH OF LDPE | DECAY RATE (SECONDS) +5KV/−5KV AFTER RECONDITIONING[4] | |
|---|---|---|---|---|---|
| | | | | 1 DAY | 4 DAYS |
| 1 | 3.3 | 0.44 | 0 | 3.5/3.7 | >60/>60 |
| 2[5] | 3.2 | 0.44 | 0 | 10.8/13 | >60/>60 |
| 3 | 2.8 | 0.44 | 1.0 | 0.4/0.8 | 0.8/2.5 |
| 4 | 1.0 | 0.44 | 1.3 | 0.7/1.0 | 0.9/1.3 |
| 5 | 3.6 | 1.8 | 0.2 | 0.8/1.7 | 0.9/1.3 |

[1] Foam made on 68 mm twin screw extruder at a LDPE flow rate of 40 Kg/hr. except #5 which was from 90 mm twin screw, 100 Kg/hr. LDPE with hydrocarbon blowing agent.
[2] GMS: Glycerol monostearate, 1 to 4 under ICI trade name Atmer 129.5, Witco Humko Atmos 150.
[3] SAS: Sodium Alkyl Sulfonate, ICI trade name Atmer 190.
[4] Preconditioning condition: 15% relative humidity and 21.1° C.
[5] Include 2 PPH ethylene vinyl acetate.

The invention has been described in considerable detail with reference to its preferred embodiments. It will be apparent that numerous variations and modifications can be made without departing from the spirit and scope of the invention as described in the foregoing detailed specification and as defined in the following claims.

That which is claimed is:

1. A process for producing a foam polyolefin product exhibiting desirable antistatic properties, comprising of the steps of:
    forming a polyolefin composition comprising a polyolefin resin; a hydrocarbyl sulphonate; and an ester of a long-chain fatty acid and polyhydric alcohol, said sulphonate and said ester each being present in said composition in an amount sufficient to form a polyolefin foam product having desirable antistatic properties;
    adding to said composition a blowing agent for expanding said composition; and
    extruding the mixture of said composition and said blowing agent under conditions so as to produce a foamed antistatic polyolefin product.

2. The process of claim 1 wherein the blowing agent and polyolefin composition are mixed in a melting zone of an extruder at a temperature above the melting point of the polyolefin that is sufficient to provide fluidity for mixing.

3. The process of claim 2 wherein the temperature of the composition in the melting zone is from about 20° C. above the melting point of the polyolefin to about 100° C. above the melting point of the polyolefin.

4. The process of claim 1 wherein the step of extruding the mixture of composition and blowing agent comprises extruding the mixture through a die orifice into a zone of reduced pressure to expand the composition.

5. The process of claim 1 wherein said hydrocarbyl sulphonate has the formula R—SO$_3$—X, wherein R is alkyl, aryl, or alkyl aryl, and X is an alkali or alkaline earth metal.

6. The process of claim 1 wherein said hydrocarbyl sulphonate is a sodium C10 to C18 alkyl sulphonate.

7. The process of claim 1 wherein said sulphonate is present in said composition in an amount from about 0.05 to about 1.5 percent by weight of said polyolefin.

8. The process of claim 1 wherein said sulphonate is present in said composition in an amount from about 0.2 to about 0.7 percent by weight of said polyolefin.

9. The process of claim 1 wherein said ester is a compound having the formula R—COOCH$_2$CHOHCH$_2$OH, wherein R is an alkyl having 4 to 23 carbon atoms.

10. The process of claim 9 wherein said ester is glycerol monostearate.

11. The process of claim 1 wherein said ester is present in said composition in an amount from about 0.3 to about 3.0 percent by weight of said polyolefin.

12. The process of claim 1 wherein said ester is present in said composition in an amount from about 0.7 to about 2.0 percent by weight of said polyolefin.

13. The process of claim 1 wherein said polyolefin is selected from the group consisting of polyethylene, polypropylene, polybutene, and copolymers and blends thereof.

14. The process of claim 1 wherein said blowing agent is a hydrocarbon selected from the group consisting of n-butane, isobutane, propane, halogenated hydrocarbons and mixtures thereof.

15. The process of claim 1 wherein said step of extruding the mixture is continuous.

16. A process for producing a foam polyolefin product exhibiting desirable antistatic properties, comprising of the steps of:

forming a polyolefin composition comprising a polyolefin resin; about 0.05 to about 1.5 percent by weight of said polyolefin of an hydrocarbyl sulphonate having the formula $R-SO_3-X$, wherein R is alkyl, aryl, or alkyl aryl, and X is an alkali or alkaline earth metal; and about 0.3 to about 3.0 percent by weight of said polyolefin of an ester of a long-chain fatty acid and polyhydric alcohol having the formula $R-COOCH_2CHOHCH_2OH$, wherein R is an alkyl having 4 to 23 carbon atoms;

adding to said composition a hydrocarbon blowing agent for expanding said composition; and extruding the mixture of said composition and said blowing agent under conditions so as to produce a foamed antistatic polyolefin product.

17. The process of claim 16 wherein the blowing agent and polyolefin composition are mixed in a melting zone of an extruder at a temperature above the melting point of the polyolefin that is sufficient to provide fluidity for mixing.

18. The process of claim 17 wherein the temperature of the composition in the melting zone is from about 20° C. above the melting point of the polyolefin to about 100° C. above the melting point of the polyolefin.

19. The process of claim 16 wherein the step of extruding the mixture of composition and blowing agent comprises extruding the mixture through a die orifice into a zone of reduced pressure to expand the composition.

* * * * *

UNITED STATES PATENT AND TRADEMARK OFFICE
CERTIFICATE OF CORRECTION

PATENT NO. : 5,314,924

DATED : May 24, 1994

INVENTOR(S) : Shau-Tarng Lee

It is certified that error appears in the above-identified patent and that said Letters Patent is hereby corrected as shown below:

Column 8, line 38, "1" should be -- 5 --.

Signed and Sealed this

Twenty-third Day of August, 1994

Attest:

BRUCE LEHMAN

Attesting Officer          Commissioner of Patents and Trademarks